United States Patent
Besson et al.

(10) Patent No.: US 9,713,897 B2
(45) Date of Patent: Jul. 25, 2017

(54) PREFORM AND METHOD FOR THE MANUFACTURE OF A PEF CONTAINER USING SAID PREFORM BY INJECTION STRETCH BLOW-MOLDING

(71) Applicant: SOCIETE ANONYME DES EAUX MINERALES D'EVIAN et en abrege "S.A.E.M.E.", Evian-les-Bains (FR)

(72) Inventors: Jean-Paul Besson, Abondance (FR); Marie-Bernard Bouffand, Le Lyaud (FR); Philippe Reutenauer, Armoy (FR)

(73) Assignee: SOCIETE ANONYME DES EAUX MINERALES D'EVIAN et en abrégé "S.A.E.M.E", Evian-les-Bains (FR)

( * ) Notice: Subject to any disclaimer, the term of this patent is extended or adjusted under 35 U.S.C. 154(b) by 0 days.

(21) Appl. No.: 14/908,204

(22) PCT Filed: Aug. 1, 2013

(86) PCT No.: PCT/IB2013/002115
§ 371 (c)(1),
(2) Date: Jan. 28, 2016

(87) PCT Pub. No.: WO2015/015243
PCT Pub. Date: Feb. 5, 2015

(65) Prior Publication Data
US 2016/0167279 A1 Jun. 16, 2016

(51) Int. Cl.
*B29C 49/00* (2006.01)
*B29C 49/12* (2006.01)
(Continued)

(52) U.S. Cl.
CPC .......... *B29C 49/0005* (2013.01); *B29B 11/08* (2013.01); *B29C 49/06* (2013.01);
(Continued)

(58) Field of Classification Search
CPC ..... B29C 49/0005; B29C 49/12; B29C 49/06; B29C 49/46; B29C 2049/4664;
(Continued)

(56) References Cited

U.S. PATENT DOCUMENTS

2006/0257603 A1 11/2006 Shi et al.
2008/0050546 A1 2/2008 Kitano et al.

FOREIGN PATENT DOCUMENTS

| WO | 2010/077133 | 7/2010 |
| WO | 2013/062408 | 5/2013 |
| WO | 2013/182541 | 12/2013 |

*Primary Examiner* — Michael C Miggins
(74) *Attorney, Agent, or Firm* — Clark & Brody

(57) ABSTRACT

A preform, which makes it possible to obtain PEF containers (bottles) having the awaited properties, notably mechanical, by an industrial injection stretch blow molding process, is of made of a thermoplastic PEF polymer of 2,5-FuranDiCarboxylic Acid (2,5-FDCA) monomer and monoethylene glycol (MEG) monomer and comprises a neck end 2, a neck support ring 3, and a closed tubular body portion 4. The preform is designed so as to produce, by injection stretch blow-molding, a container, the axial stretch ratio of which is greater than or equal to its hoop stretch ratio. Also provided is a plastic container 10, preferably a bottle, obtained by injection stretch blow-molding of PEF preform, the bottle 10 having an axial stretch ratio greater than or equal to the hoop stretch ratio. A method for manufacturing the bottle 10 is also provided.

15 Claims, 4 Drawing Sheets

Figure 1:
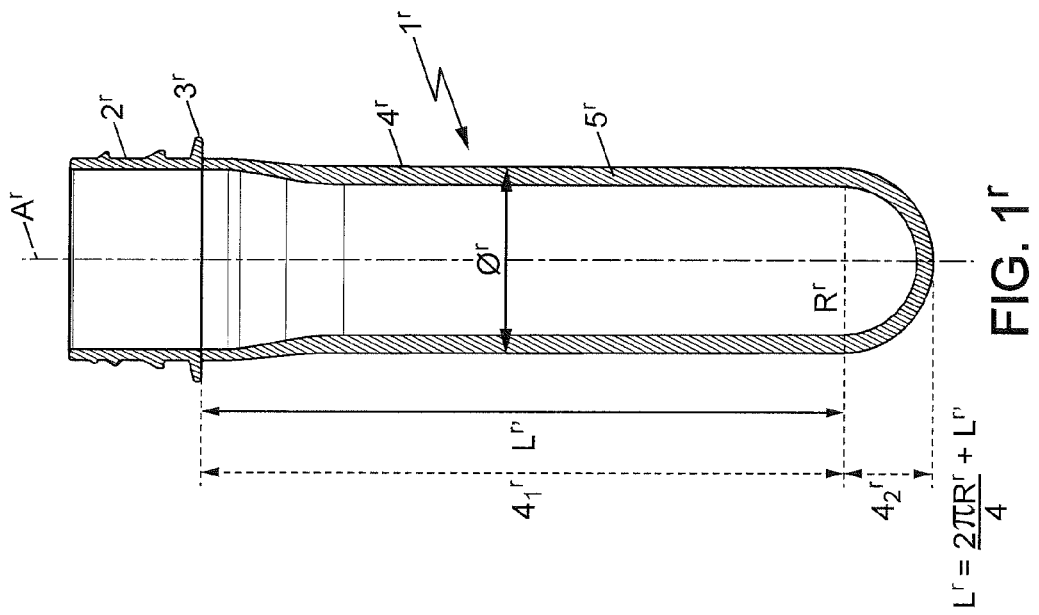
Figure 1:
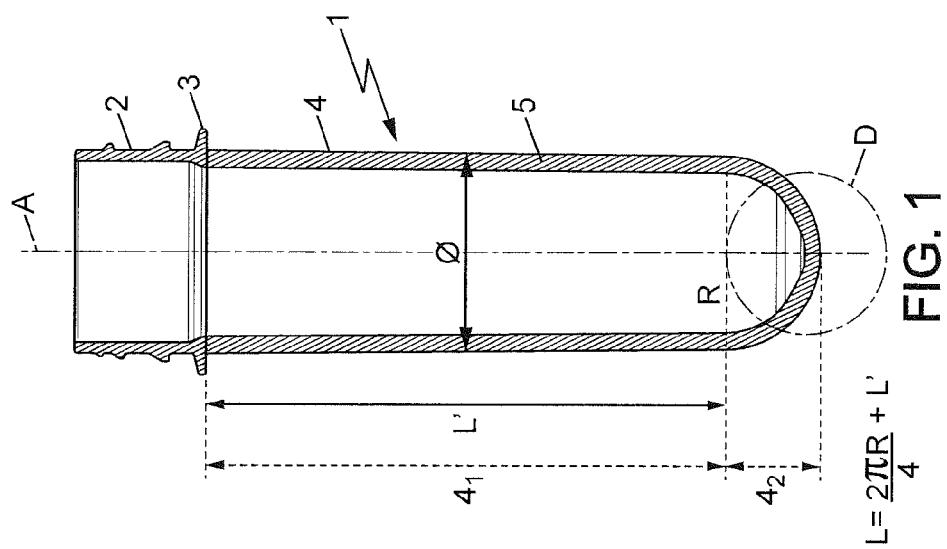

(51) Int. Cl.
| | |
|---|---|
| *C08G 63/181* | (2006.01) |
| *B29C 49/06* | (2006.01) |
| *B29B 11/08* | (2006.01) |
| *B29C 49/46* | (2006.01) |
| *B65D 85/72* | (2006.01) |
| *C08K 3/22* | (2006.01) |
| *B29K 67/00* | (2006.01) |
| *B29K 105/00* | (2006.01) |
| *B29L 31/00* | (2006.01) |

(52) U.S. Cl.
CPC .............. B29C 49/12 (2013.01); B29C 49/46 (2013.01); B65D 85/72 (2013.01); C08G 63/181 (2013.01); B29B 2911/1476 (2013.01); B29B 2911/14693 (2013.01); B29B 2911/14753 (2013.01); B29B 2911/14773 (2013.01); B29C 2049/4664 (2013.01); B29K 2067/04 (2013.01); B29K 2105/258 (2013.01); B29L 2031/7158 (2013.01); C08K 2003/2227 (2013.01); C08K 2003/2241 (2013.01); C08K 2201/014 (2013.01)

(58) Field of Classification Search
CPC ........ C08G 63/181; B29B 2911/14773; B29B 2911/14693; B29B 2911/14753; B29B 2911/1476; B29B 11/08; C08K 2003/2227; C08K 2003/2241; C08K 2201/014; B29K 2067/04; B29K 2105/258; B29L 2031/7158; B65D 85/72
See application file for complete search history.

FIG. 1$^r$

PREFORM AND METHOD FOR THE MANUFACTURE OF A PEF CONTAINER USING SAID PREFORM BY INJECTION STRETCH BLOW-MOLDING

TECHNICAL FIELD

The invention relates to the injection stretch blow-molding of a particular thermoplastic polymer, namely the Poly-Ethylene Furanoate (PEF), for the manufacture of a container, preferably a bottle.

The invention pertains notably to the container (bottle), to the PEF preform used in the manufacture of said container, and to the method of manufacture.

BACKGROUND ART AND TECHNICAL PROBLEMS

In the injection stretch blow molding process, the plastic is first molded into a "preform" using the injection molding process. These preforms are produced with the necks of the containers, including threads (the "finish") on one end. These preforms are packaged, and fed later (after cooling) into a reheat stretch blow molding machine, wherein the preforms are heated above their glass transition temperature, then blown using high pressure air into bottles using metal blow molds. The blowing device includes a blowpipe which injects pressurized air inside the preform to expand it and to fit the mold. The blowpipe also participates to the stretching by leaning and pressing on the bottom of preform during stretching and blowing.

PolyEthylenTerephthalate (PET) is a polymer generally used for making bottles, by this injection stretch blow molding process. There is a demand for polymers based on renewables, for example that can be efficiently biosourced, to replace PET.

PolyEthylene Furanoate (PEF) is a polymer that can be at least partially biosourced. Document WO 2010/077133 describes, for example, appropriate processes for making a PEF polymer having a 2,5-furandicarboxylate moiety within the polymer backbone. This polymer is prepared by esterification of the 2,5-furandicarboxylate moiety [2,5-Furandicarboxylic acid (FDCA) or dimethyl-2,5-furandicarboxylate (DMF)] and condensation of the ester with a diol or polyol (ethylene glycol, 1,3-propanediol, 1,4-butanediol, 1,4-cyclohexanedimethanol, 1,6-hexanediol, 2,2-dimethyl-1,3-propanediol, poly(ethylene glycol), poly(tetrahydrofuran), glycerol, pentaerythritol). Some of these acid and alcohol moieties can be obtained from renewable crop derived raw material.

It has been disclosed that some containers (bottles) made of PEF have been made. Said containers (bottles) are however believed to be quite basic. There is a need for advanced PEF containers (bottles) notably in terms of compromise lightness (raw material saving) and mechanical properties (assessed e.g. by a drop test), with respect to the widespread PET containers (bottles).

Moreover, the PEF containers obtained by injection stretch blow molding shall have to comply with at least one of the following specifications: processability (windows of process parameters, i.a. temperature), high transparency, food safety, water & airtightness . . . .

The invention aims at addressing at least one of the above problems and/or needs.

GENERAL DESCRIPTION OF THE INVENTION

In the present description, "PEF" means any thermoplastic polymer of at least one FuranDiCarboxylic Acid (FDCA) monomer, preferably 2,5-FuranDiCarboxylic Acid (2,5-FDCA) monomer, and at least one diol monomer, preferably monoethylene glycol (MEG) monomer.

Pursuing this goal, the inventors have had the merit to develop new and improved PEF containers (bottles) and preforms, which make it possible to reach the awaited properties, notably the technical compromise low weight/good mechanical strength, by an industrial injection stretch blow molding process.

The Bottle

To that end, according to a first aspect, the invention proposes a plastic container, preferably a bottle, obtained by injection stretch blow-molding of a preform, notably the preform such as defined below, made of at least one thermoplastic polymer of at least one FuranDiCarboxylic Acid (FDCA) monomer, preferably 2,5-FuranDiCarboxylic Acid (2,5-FDCA) monomer, and at least one diol monomer, preferably monoethylene glycol (MEG) monomer and wherein the axial stretch ratio is greater than or equal to the hoop stretch ratio.

Advantageously, said plastic container, preferably said bottle, has the following axial and hoop stretch ratios:

a axial stretch ratio greater than or equal to—in an increasing order of preference—: 3.5; 4.0; 4.15; 4.30; 4.5; 5.0;
  and a hoop stretch ratio smaller than or equal to—in an increasing order of preference—: 4.0; 3.75; 3.60; 3.50; 3.40; 3.30; 3.20; 3.0; 2.5.

For example:
  the axial stretch ratio is comprised between 4 and 10;
  and the hoop stretch ratio is comprised between 3.20 and 3.95.

In a preferred embodiment, the plastic container, preferably a bottle, according to the invention, includes from the top to the base:
  a neck,
  a shoulder,
  a tubular body portion,
  and a bottom,
wherein the ratio [bottom mass BM/total mass TM]×100, is such that—in % by weight and in an increasing order of preference—:
  (BM/TM)≤13.5
  6<(BM/TM)≤11.5
  6<(BM/TM)≤10.5
  6<(BM/TM)≤9.5
  6<(BM/TM)≤7.5

In other optional and interesting embodiments, the invention may comprise one or several of the following features:
  a. It comprises at least one imprint, which is preferably selected from the group consisting of splines, grooves, ribs, embossings, decorative patterns, gripping elements, trademark indications, production indications, Braille characters and a combination thereof.
  b. The bottom of the container (bottle) includes:
    a terminal curved portion
    an internal axially inwardly directed dome
    a base joining the terminal curved portion to the dome;
    and reinforcements, which preferably comprise radially extended grooves and/or ribs with respect to the axis (A) on the bottom, said grooves and/or ribs being regularly arranged around the axis (A), preferably on the terminal curve portion and on the base, and possibly on the dome. These reinforcements can form a petal bottom.
  c. There is at least one imprint, which is a bulge located close to the apex of the dome and which comes from an extra-thickness, which is present on the base of the preform such as defined below and on which the lower end of the blowpipe is intended to rest during the blowing of the injection stretch blow-molding.

d. The imprint has two coplanar edges and an intermediate portion between the two edges, said intermediate portion presenting an apex shifted with respect to the two edges (inwardly for a recessed imprint such as a groove, spline or the like, and outwardly for a protruding imprint such as a rib or the like), the imprint presenting a width (w) measured between the two edges and a maximum height (h) measured between the edges and the apex.

e. The imprint comprises a groove of which apex is shifted inwardly with respect to the two edges.

f. The width (w) and the maximum height (h) are such that the ratio of the maximum height to the width (h/w) is—in an increasing order of preference—greater than or equal to 0.8; 1.0; 1.2; and preferably comprised between 1.2 and 200; 1.2 and 50; 1.2 and 20.

g. The body of the container is provided with at least two adjacent imprints spaced apart from one another along an axis according to a pitch (Pi), the pitch (Pi) and the maximum height (h) of the imprint being such that:
when the maximum height is equal to 2 mm, then the pitch is lower than or equal to 5 mm, preferably 4 mm, more preferably 3 mm, more preferably 2 mm, more preferably 1 mm,
when the pitch is equal to 5 mm, then the maximum height is greater than or equal to 2 mm, preferably 3 mm, more preferably 4 mm, more preferably 6 mm, more preferably 8 mm.

h. The imprint has an imprint profile in a plane transverse to the edges, the imprint profile comprising a plurality of points each having a radius of curvature ($Rc^{PEF}$), the radius of curvature ($Rc^{PEF}$) at each point of the imprint profile being lower than 1 mm, preferably lower than 0 7 mm, more preferably lower than 0.5 mm, more preferably lower than 0 3 mm.

i. The tubular body portion of the container (bottle) is cylindrical along an axis and comprises a lateral wall extending along the axis, said at least one imprint comprising at least one circumferential imprint extending at least partly around the axis on the lateral wall.

j. The container (bottle) is filled with a liquid, for example a beverage or a non-food liquid such as a home care product or a personal care product, preferably a beverage.

k. The container (bottle), filled or empty, is closed by a closure, for example a cap.

The Preform

According to a second aspect, the invention proposes a preform for the manufacture of a plastic container, preferably a bottle, —notably the one according to the invention, said preform being of made of at least one thermoplastic polymer of at least one FuranDiCarboxylic Acid (FDCA) monomer, preferably 2,5-FuranDiCarboxylic Acid (2,5-FDCA) monomer, and at least one diol monomer, preferably monoethylene glycol (MEG) monomer and said preform comprising
a neck end;
a neck support ring;
and a closed tubular body portion;
characterized by a ratio Ø/L, wherein Ø is a specific outer diameter of the closed tubular body portion and L is the generatrix length of the preform closed tubular body portion.
Ø and L are defined precisely infra.

Advantageously, Ø/L is such that—in an increasing order of preference—:
0.10<(Ø/L)≤0.50
0.15<(Ø/L)≤0.45
0.20<(Ø/L)≤0.40
0.25<(Ø/L)≤0.35.

Such a preform has surprisingly enabled to manufacture PEF containers (bottles) with improved mechanical properties, without prejudice to the other requested specifications, in the industrial field of manufacturing containers for the packaging of beverages, notably water.

Preferably, the preform according to the invention is designed so as to produce, by stretch blow-molding, a container, in a manner that the axial stretch ratio is greater than or equal to its hoop stretch ratio.

Advantageously, the minimal thickness ($t_{min}$) of the side wall of the closed tubular body portion (4) is—in mm and in an increasing order of preference—:
$1.0<(t_{min})≤4.5$
$1.5<(t_{min})≤4.0$,
$2.0<(t_{min})≤3.5$,
$2.0<(t_{min})≤3.2$ According to a remarkable feature of the invention, the preform has:
a diameter Ø greater than or equal to the diameter $Ø^r$ of a PET reference preform (10$^r$) intended to be used in the manufacture of a PET reference plastic container (1$^r$), preferably a bottle, identical, in all points except the plastic raw material, to the PEF container (1) obtained by stretch blow-molding from the preform (10);
and a length L lower than or equal to the length $L^r$ of the PET reference preform (10$^r$).

In view of improving the properties of the container (bottle), the preform according to the invention, can present a base having an extra-thickness on which the lower end of the blowpipe is intended to rest during the blowing of the injection stretch blow-molding.

The Method for Manufacturing the Bottle

According to a third aspect, the invention proposes a method of making a bottle as previously defined, comprising the steps of:
providing a preform as above defined,
placing the preform in a mold,
blowing the preform in the mold with a blowing device including a blowpipe, adapted to supply the cavity with a fluid at a blowing pressure to form the container (1), the mold being possibly heated at a temperature greater than or equal to 50° C., preferably comprised between 50° C. and 100° C., more preferably between 65° C. and 85° C.,
so as the axial stretch ratio of the container be greater than or equal to its hoop stretch ratio.

It is mentioned that the method according to the invention can also comprise a further step of filling the bottle with a liquid, for example a beverage or a non-food liquid such as a home care product or a personal care product, preferably a beverage. It is mentioned that the method according to the invention can also comprise a step of closing the bottle, filled or empty, with a closure, for example a cap.

The provided preform may be made by injection molding and may comprise a hollow tube extending along an axis and having a closed bottom end and an opened top end.

The stretch blowing of the preform comprises, possibly reheating of the perform, and then blowing of it through the opened top end at a blowing pressure less than or equal to 35 bars, preferably 30 bars, more preferably 25 bars, more preferably 20 bars, more preferably 15 bars, more preferably 10 bars.

The ability of the thermoplastic polymer of the invention to follow the profile of the imprinting member of the mold further makes it possible to lower the blowing pressure needed at the stretch blow molding step.

The beverage that can be filled in the bottles can be for example water, for example purified water, spring water, natural mineral water, optionally flavored, optionally carbonated. The beverage can be an alcoholic beverage such as bier. The beverage can be a soda for example a cola beverage, preferably carbonated. The beverage can be a fruit juice, optionally carbonated. The beverage can be vitamin water or an energy drink. The beverage can be a milk based product such as milk or drinking dairy fermented products such as yogurt.

The Polymer Constituting the Bottle: Structure-preparation

The polymer comprises moieties corresponding to a FDCA monomer, preferably 2,5-FDCA, and moieties corresponding to a diol monomer, preferably a monoethylene glycol. The polymer is typically obtained by polymerizing monomers providing such moieties in the polymer. To that end one can use as monomers FDCA, preferably 2,5-FDCA or a diester thereof. Thus the polymerization can be an esterification or a trans-esterification, both being also referred to as (poly)condensation reactions. One preferably uses dimethyl-2,5-furandicarboxylate (DMF) as a monomer.

The 2,5-FDCA moiety or monomer can be obtained from a 2,5-furandicarboxylate ester is an ester of a volatile alcohol or phenol or ethylene glycol, preferably having a boiling point of less than 150° C., more preferably having a boiling point of less than 100° C., still more preferably diester of methanol or ethanol, most preferably of methanol. 2,5-FDCA or DMF are typically considered as biosourced.

The 2,5-FDCA or ester thereof may be used in combination with one or more other dicarboxylic acid, esters or lactones.

The diol monomer can be an aromatic, aliphatic or cycloaliphatic diol. Examples of suitable diol and polyol monomers therefore include ethylene glycol, diethylene glycol, 1,2-propanediol, 1,3-propanediol, 1,4-butanediol, 1,5-pentanediol, 1,6-hexanediol, 1,4-cyclohexanedimethanol, 1,1,3,3-tetramethylcyclobutanediol, 1,4-benzenedimethanol, 2,2-dimethyl-1,3-propanediol, poly(ethylene glycol), poly(tetrahydofuran), 2,5-di(hydroxymethyl) tetrahydrofuran, isosorbide, glycerol, 25 pentaerythritol, sorbitol, mannitol, erythritol, threitol. Ethylene glycol, 1,3-propanediol, 1,4-butanediol, 1,4-cyclohexanedimethanol, 1,6-hexanediol, 2,2-dimethyl-1,3-propanediol, poly(ethylene glycol), poly(tetrahydofuran), glycerol, and pentaerythritol, are particularly preferred diols.

In the preferred embodiment the diol is Ethylene Glycol (MonoEthylene Glycol—MEG), preferably biosourced. For example biosourced MEG can be obtained from ethanol which can also be prepared by fermentation from sugars, (e.g. glucose, fructose, xylose) that can be obtained from crop or agricultural by-products, forestry byproducts or solid municipal waste by hydrolysis of starch, cellulose, or hemicellulose. Alternatively, biosourced MEG can be obtained from glycerol, that itself can be obtained as waste from biodiesel.

The thermoplastic polymer, which is the raw material of the bottle according to the invention, can also comprise other diacid monomers, such as dicarboxylic acid or polycarboxylic acid, for instance terephthalic acid, isophtahalic acid, cyclohexane dicarboxylic acid, maleic acid, succinic acid, 1,3,5-benzenetricarboxylic acid. Lactones can also be used in combination with the 2,5-furandicarboxylate ester: pivalolactone, ε-caprolactone and lactides (L,L; D,D; D,L). Even if it is not the most preferred embodiment of the invention, the polymer can be non linear, branched, thanks to the use of polyfunctional monomers (more than 2 acid or hydroxyl functions per molecule), either acid and/or hydroxylic monomers, e.g polyfunctional aromatic, aliphatic or cycloaliphatic polyols, or polyacids.

According to a preferred embodiment of the invention, the polymer is a PEF material using biosourced 2,5-FDCA and biosourced MonoEthylene Glycol. Indeed, 2,5-FDCA comes from 5-hydroxymethylfurfural (5-HMF) which is produced from glucose or fructose (obtained from renewable ressources). MonoEthylene Glycol can be obtained from ethanol which can also be prepared by fermentation from sugars, (e.g. glucose, fructose, xylose) that can be obtained from crop or agricultural by-products, forestry by-products or solid municipal waste by hydrolysis of starch, cellulose, or hemicellulose. Alternatively, MonoEthyleneGlycol can be obtained from glycerol, that itself can be obtained as waste from biodiesel.

This is referred to as a 100% biobased or biosourced PEF as most of the monomers used are considered as biosourced. As some co-monomers and/or some additives, and/or some impurities and/or some atoms might not be biosourced, the actual amount of biosourced material can be lower than 100%, for example between 75% and 99% by weight, preferably from 85 to 95%. PEF can be prepared according to the public state of the art in making PEF, for example as described in document WO 2010/077133. Bottles can be made with such a material for example by Injection Blow Molding (IBM) processes, preferably by Injection Stretch Blow Molding (ISBM) processes. Such bottle can have similar properties than previously publicly described with PEF wherein 2,5-FDCA or MonoEthylene Glycol are not biosourced. Such properties, including mechanical properties can be improved compared to PET.

The term "polymer" according to the present invention encompasses homopolymers and copolymers, such as random or block copolymers.

The polymer has a number average molecular weight (Mn) of at least 10,000 Daltons (as determined by GPC based on polystyrene standards). Mn of the polymer is preferably comprised between—in Dalton or g/mol and an increasing order of preference—10000 and 100000; 15000 and 90000; 20000 and 80000; 25000 and 70000; 28000 and 60000.

According to a remarkable feature of the invention, the polymer polydispersity index (PDI)=Mw/Mn (Mw=weight average molecular weight), is defined as follows—in an increasing order of preference—: $1<PDI \leq 5$; $1.1 \leq PDI \leq 4$; $1.2 \leq PDI \leq 3$; $1.3 \leq PDI \leq 2.5$; $1.4 \leq PDI \leq 2.6$; $1.5 \leq PDI \leq 2.5$; $1.6 \leq PDI \leq 2.3$.

Generally, the process for preparing the polymer comprises the following steps: Step 1: (trans)esterification of the 2,5-FDCA (diester) with the corresponding diol, followed by Step 2: (poly)condensation reaction of the resulting (oligomeric) glycol 2,5-furan dicarboxylate esters. The process for preparing PEF can comprise a Solid State Polymerization (SSP) step.

According to a fourth aspect, the invention proposes the use of at least one thermoplastic polymer of at least one FuranDiCarboxylic Acid (FDCA) monomer, preferably 2,5-FuranDiCarboxylic Acid (2,5) monomer, and at least one diol monomer, preferably monoethylene glycol (MEG) monomer, in a bottle as previously defined.

DETAILED DESCRIPTION OF THE INVENTION

Further objects and advantages of the invention will emerge from the following disclosure of a particular embodiment of the invention given as a non limitative example, the disclosure being made in reference to the enclosed drawings in which:

FIG. 1 is a longitudinal section through its axis A of the PEF preform according to a preferred embodiment of the invention.

Figure 3:
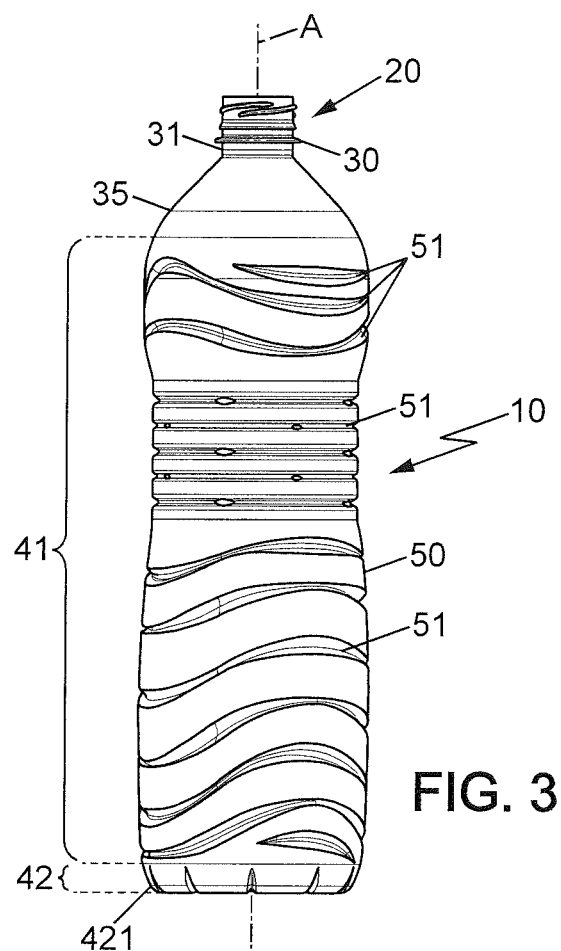

FIG. 1$^r$ a longitudinal section through its axis A$^r$ of a PET reference preform (10$^r$) intended to be used in the manufacture by injection stretch blow-molding of a PET reference plastic container (1$^r$), namely a bottle, identical to the PEF bottle of FIG. 3.

Figure 2:
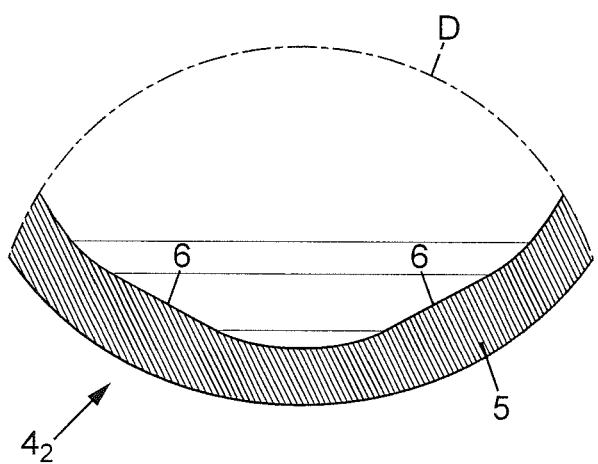
Figure 4:
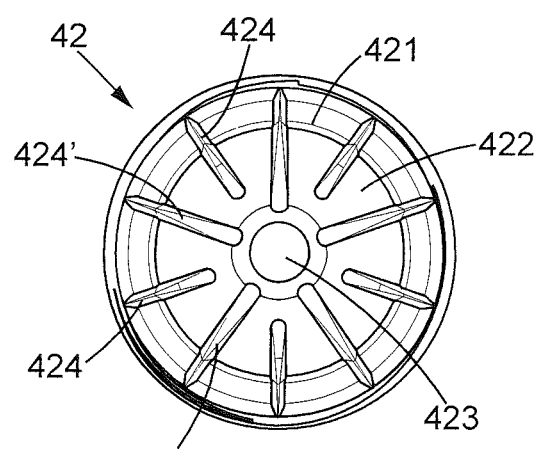
Figure 5A:
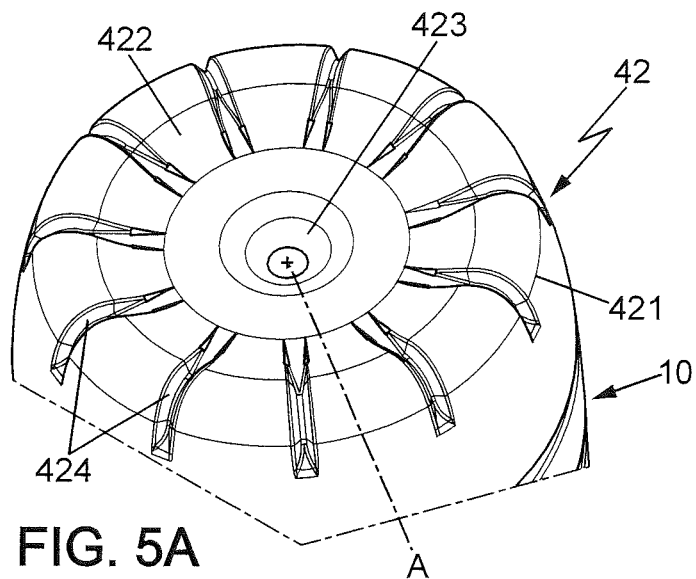
Figure 5B:
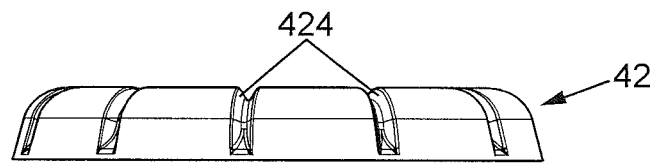

FIG. 2 is an enlarged view of the detail referenced D on FIG. 1 representing the closed end of the PEF preform, FIG. 3 is a view of the PEF bottle obtained the PEF preform of FIG. 1, by an injection stretch blow molding process, FIG. 4 is a bottom view of the bottle of FIG. 3, FIGS. 5A; 5B; 5C are respectively/ a perspective bottom view of a part of the lower region of a bottle 10' which is a variant of the bottle 10 of FIG. 3;

a side view of the bottom of the bottle of FIG. 5A;

a bottom view of FIGS. 5A & 5B.

On the Figures, the same reference numbers refer to the same or similar elements.

FIG. 1 represents an injection moulded plastic preform 1 for the manufacture by blow molding of the thin-walled container, preferably a bottle 10, as represented on FIG. 3. Said preform 1 comprises from the top to the bottom:

a neck end 2;

a neck support ring 3;

and a closed tubular body portion 4;

According to a possibility, there can be a transition zone between the neck support ring 3 and the closed tubular portion 4.

The neck end 2 and the neck support ring 3 form together the neck finish.

The preform 1 is a hollow tube extending along an axis A and having a closed bottom end 5 and an opened top end 6.

The top portion of the preform 1 close to the opened top end 6 and which is composed of the neck end 2 and of the neck support ring 3, does not undergo any transformation during the shaping of the bottle 10 by stretch blowing. So, the neck end 2 and of the neck support ring 3 correspond to the neck end 20 and to the neck support ring 30 of the bottle 10 as shown on FIG. 3.

The remaining portion of the tube is the closed tubular body portion 4 which comprises a straight part 4$_1$ (length L') starting just below the neck support ring to a bottom curved part 4$_2$. Said straight part 4$_1$ has a circular cross section, the external diameter of which can be steady, decreasing and/or increasing on at least one segment of the straight part 4$_1$ of the closed tubular body 4. The thickness of the wall 5 of said straight part 4$_1$ can vary but is at least partly steady.

The preform 1 is also defined by the diameter Ø and the length L, as shown on FIGS. 1&2. Ø is the outer diameter of the straight part 4$_1$ of the closed tubular body portion 4 measured at the middle of the longer segment of the straight part 4$_1$, which has a steady thickness and L is the length of a generatrix of the closed tubular body 4 from the lower face of the neck support ring 3 to the lower end of the preform, i. e of the straight part 4$_1$ and of the bottom curved part 4$_2$. As the bottom curved part 4$_2$ is circular and has a radius R, L=(2πR)4+L'.

As a non-limitative example, the PEF preform 1 may have a Ø of 25-28 mm, a L of 109-111 mm and so a Ø/L of 0.225-0.256.

As a comparison, the PET reference preform 10$^r$ shown on FIG. 1$^r$ (with the same reference numbers as in FIG. 1 with an exponent$^r$) has a diameter Ø$^r$ of 26 mm a length L$^r$ of 128 mm, and so a ratio Ø$^r$/L$^r$ of 0.203.

The enlarged view of the region D of the preform 1 shown on FIG. 2, makes it appear that the bottom curved part 4$_2$ presents an annular extra-thickness 6 on which the lower end of the blowpipe used in the manufacture process of a container (bottle 10) from the preform 1 by injection stretch blow molding, is intended to rest during the blowing. This feature improves the mechanical properties of the container (bottle 10) and leaves an imprint on the bottom of the container (bottle 10) as it will be presented hereafter.

In the following of the description, the terms "inside", "inwards", "inwardly" and similar will refer to an element situated close to or directed towards the inner of the bottle 10 and the terms "outside", "outwards", "outwardly" and similar will refer to an element situated apart from or directed opposite to the housing or the axis.

The bottle 10 obtained by stretch blow molding of the injection molded preform 1, is represented on FIGS. 3-5. Said bottle 10 is suitable for containing for example a liquid such as water. The bottle 10 of circular cross section, comprises a neck 20 a neck support ring 30 a neck extension 31 a shoulder 35 a tubular body portion 41, the wall of which is designated by the reference 50 and includes imprints 51.

and a bottom 42

Said bottom 42 includes:

a terminal curved portion 421 an internal axially inwardly directed dome 423 a base 422 joining the terminal curved portion 421 to the dome 423 and reinforcements 424.

The reinforcements 424 are radially extended grooves with respect to the axis (A) on the bottom 42. Said grooves 424 are regularly arranged around the axis (A$^r$), on the terminal curve portion 421 and on the base 422. As shown on FIG. 4, some of the radial grooves 424, with the reference 424' are longer and extend further than the base 422, to the dome 423. These long grooves 424' are intercalated between the short grooves 424.

Figure 5C:
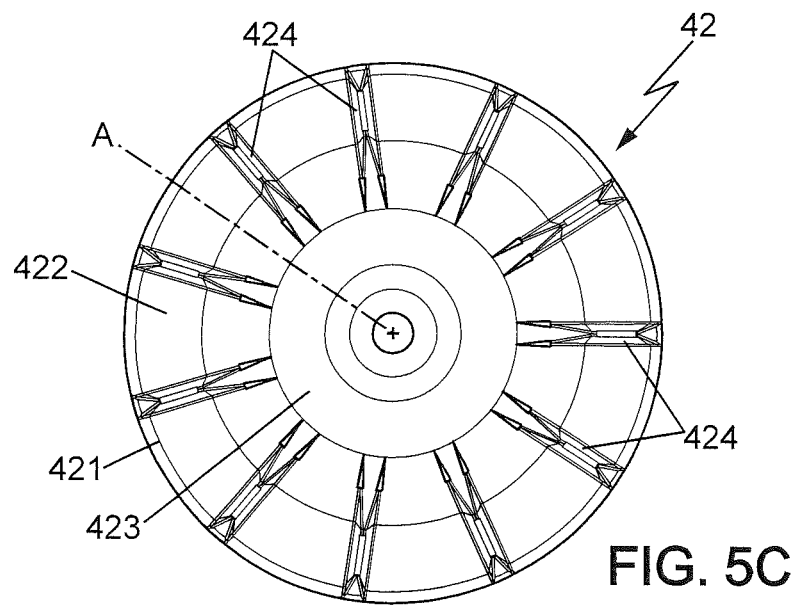

In the variant of FIGS. 5A, 5B & 5C, the radial grooves 424 of the bottom 42 are also regularly arranged around the axis (A), on the terminal curve portion and on the base 422. They all start from the edge of the terminal curve portion 421 (FIG. 5B) and have substantially the same length.

As a non-limitative example, the bottle 10 may have an axial stretch ratio of 4.19 and a hoop stretch ratio of 3.55.

This bottle 10 according to this non limitative embodiment is also characterized by a [bottom mass BM/total mass TM]·100 ratio of [3/26]×100=11.5%

Although the invention has been disclosed with a cylindrical bottle comprising several grooves as imprints, the invention is not limited thereto. In particular, the bottle could be of any other suitable shape, such as cylindrical of elliptic, polygonal or other cross-section. Besides, the envelop could be provided with one or several imprints consisting in a local deformation in recess, as previously disclosed in relation with grooves, or in a local deformation in relief, i.e. protruding, with respect to the two adjacent portions. In the later case, the intermediate portion of such imprint presents an apex shifted outwardly, i.e. opposite to the axis A, with respect to the two edges. Thus, the imprint could be of any kind, especially selected from the group consisting of splines, grooves, ribs, embossings, decorative patterns, gripping elements, trademark indications, production indications, Braille characters and a combination thereof.

The bottle 10 can be filled with a liquid, such as water or another beverage, before a cap is screwed and sealed to the neck 5.

The bottle 10 described in this example is made of a thermoplastic polymer of at least one FuranDiCarboxylic Acid (FDCA) monomer and at least one diol monomer. In particular, the thermoplastic polymer is a PolyEthyleneFuranoate (PEF) based on biobased 2,5-FDCA and biobased MonoEthyleneGlycol (MEG). The preparation of the polymer and the manufacture of the bottle are detailed below.

Materials 2,5-furandicarboxylic acid (2,5-FDCA) and dimethyl-2, 5-furandicarboxylate (DMF) for example prepared according to WO2010/077133A1 or WO 2013/062408.

MEG: biosourced MEG, as diol.

PET (comparative): PET w170 supplied by Indorama, with the following features:
glass transition temperature, Tg=75° C.,
melting temperature, Tf=235° C.,
density (amorphous), d=1.33.

Preparation of the PEF Polymer

PEF resin was provided by Avantium. Recipes and methods used to prepare the PEF resin were previously disclosed (in part) in WO2010077133, in WO2013062408, in Combinatorial Chemistry & High Throughput Screening, 2012, 15(2), p180-188 and in ACS Symposium Series 1105 (Biobased Monomers, Polymers, and Materials), 2012, p1-13.

GPC measurements were performed on a Merck-Hitachi LaChrom HPLC system equipped with two PLgel 10 μm MIXED-C (300×7.5 mm) columns. Chloroform:2-chlorophenol 6:4 solvent mixture was used as eluent. Calculation of the molecular weight was based on polystyrene standards and carried out by CirrusTM PL DataStream software.

Preparation of Sample 1b ("PEF 1b")

Melt polymerization with Ti-Sb catalyst system was carried out in a stirred batch reactor. Dimethyl-2,5-furandicarboxylate (30.0 kg), and bioethylene glycol (20.2 kg) were mixed under nitrogen in the pre-dried reactor, while increasing the product temperature to 190° C. At a product temperature of 110° C., a solution of 22.195 g Ti(IV) butoxide in 200 mL toluene was added, and the reaction mixture was heated further. At a product temperature of 165° C., methanol starts to distill off. After most of the MeOH had distilled off at a product temperature of 190° C., vacuum was applied slowly to 300 mbar and reaction was continued for ca 90 minutes, while the product temperature was slowly raised to 200° C. Then vacuum was released and a solution of 14.885 g of triethyl phosphonoacetate in 150 mL, ethylene glycol was added, followed after five minutes by the addition of Sb glycolate (9.50 g Sb2O3 dissolved in 685 mL ethylene glycol). Vacuum was applied slowly to 150 mbar at which pressure most of the excess of ethylene glycol was removed via distillation. Finally, the vacuum was reduced as much as possible, but definitely below 1 mbar. The product temperature was raised to 235° C. and the molecular weight increase was monitored by measuring the stirrer torque. The polymer that was obtained from the reactor was shown to have a Mn of 14500 g/mol and an Mw/Mn of 2.3. Solid state polymerization was then performed to increase the molecular weight of the polymer. First, crystallization of the polymer was performed at 110° C. in an oven. Subsequently, the polymer was charged into a tumble dryer, a vacuum of ≤6 mBar was applied, and the temperature was slowly raised to 190-200° C. Care was taken that polymer particles do not stick together. The molecular weight increase was monitored by solution viscometry on drawn samples. The final polymer, after solid state polymerisation, had a Mn of 30300 and Mw/Mn of 2.6.

Preparation of Sample 3b1 ("PEF 3b1")

Melt polymerization with Zn-Sb catalyst system was carried out in a stirred batch reactor. Dimethyl-2,5-furandicarboxylate (20.0 kg), bioethylene glycol (15.5 kg), a solution of 7.65 anhydrous Zn(OAc)2 in 80 mL of bioethylene glycol, and Sb glycolate (4.10 g Sb2O3 dissolved in 230 mT, ethylene glycol) were mixed under nitrogen in the pre-dried reactor, while increasing the product temperature to 210° C. At a product temperature of 150° C., methanol starts to distill off. After most of the MeOH had distilled off, vacuum was applied slowly to 300 mbar and reaction was continued for ca 120 minutes, while the product temperature was kept at 200-210° C. Then vacuum was released and a solution of 12.65 g of triethyl phosphonoacetate in 60 mL ethylene glycol was added, followed after five minutes by the addition of Sb glycolate (4.10 g Sb2O3 dissolved in 230 mT, ethylene glycol). Vacuum was applied slowly to 150 mbar at which pressure most of the excess of ethylene glycol was removed via distillation. Finally, the vacuum was reduced as much as possible, but definitely below 1 mbar. The product temperature was raised to 240-245 oC and the molecular weight increase was monitored by measuring the stirrer torque. The polymer that was obtained from the reactor was shown to have a Mn of 15900 g/mol and an Mw/Mn of 2.3. Solid state polymerization was then performed to increase the molecular weight of the polymer. The polymer was charged into a tumble dryer, and dried under an nitrogen atmosphere at 110° C. Then a vacuum of ≤6 mBar was applied, and the temperature was slowly raised to 190-200° C. Care was taken that polymer particles do not stick together. The molecular weight increase was monitored by solution viscometry on drawn samples. The final polymer, after solid state polymerisation, had a Mn of 33000 and Mw/Mn of 2.6.

Manufacture of the Preform

The blow molding process implements a 25 g preform 1 made of the thermoplastic polymer PEF, the preparation of which has been hereinabove described.

As a non-limitative example, the preform 1 may have a total height Hp measured along the axis A of 103 mm and an internal diameter varying from 24 mm close to the closed bottom end $4_2$ to 26 mm close to the neck support ring 3.

To manufacture 25 g preforms 1 of the above disclosed type, a 20 kg sample of the above disclosed thermoplastic polymer PEF 3b1 is used in a Netstal Elion 800 injection molding machine. The material was heated to 255° C., with a cycle time of 17.63 s.

Preforms 1' as shown on FIG. 1' were made with the thermoplastic polymer PET, the preparation of which has been hereinabove described from Indorama, at a 28 g weight for comparison with the thermoplastic polymer PEF. The matter was heated to 270° C., with a cycle time of 20.04 s.

As a non-limitative example, the preform 1′ may have a total height Hp measured along the axis A of 121 mm and an internal diameter varying from 20 mm close to the closed bottom end 4′₂ to 24 mm close to the neck support ring 3′.

Preforms 1° identical to those shown on FIG. 1′ were made with the thermoplastic polymer PEF 1b, the preparation of which has been hereinabove described, for comparison with the PEF preform 1. The material was heated to 250° C., with a cycle time of 17.02 s.

As a non-limitative example, the preforms 1′ & 1° may have a total height Hp measured along the axis A of 121 mm and an internal diameter varying from 20 mm close to the closed bottom end 4′₂, to 24 mm close to the neck support ring 3′.

Manufacturing Method of the Bottle

The bottle according to the invention is preferably manufactured by a blow molding process implementing a mold, such as a Sidel SBO 1 machine, having a cavity comprising one or several imprinting members, and a blowing device adapted to supply the cavity with a fluid at a blowing pressure.

The PEF preforms 1 where heated to a surface temperature of 120° C. After the PEF preforms 1 have been placed in the mold at a cold temperature (10° C-13° C.), the preforms 1 can be blown through injection of the fluid at the blowing pressure within the preform through the opened top end, by means of a blowpipe which leans on the annular extra-thickness 5. In particular, the preforms 1 were blown to bottles 10 of the above disclosed type, namely a 1.5 L type with a design typical of still water, presenting grooves 51, 424, 424'.

Thanks to the use of the thermoplastic polymer PEF, the blowing pressure can be lowered to 35 bars or less, and especially, in an increasing order of preference, to 30 bars, 25 bars, 20 bars, 15 bars or 10 bars. In particular, the preforms 1 were blown with a blowing pressure of 34 bars to bottles 10.

the PEF preforms 1° were transformed into bottles 10° by the same stretch blow molded process.

The PET preforms 1′ were heated to a surface temperature of 108° C-110° C., placed in the mold at cold temperature (10° C-13° C.) and blown, at a blowing pressure greater than 35 bars, to the same 1.5 L type bottles 10 with a design typical of still water, presenting grooves 51, 424, 424', hereafter referred to as reference PET bottles 10′. Good material distribution was achieved in all cases. The so produced PET bottles 10′ are identical to the above described PEF bottles 10.

Tests and Results

In order to assess the good mechanical properties of the PEF bottles, a drop test is carried out.

PEF bottles 10: 25 grams
PEF bottles 10°: 28 grams

Protocol BOTTLES DROP TEST

The objective of this drop test is to measure the resistance of a bottle filled and capped at a cumulative and vertical drop. The bottle is dropped from different heights: distance between the bottom of the bottle and a metallic pad presenting a 10° angle from the vertical plan of the floor.

For this purpose, the bottle is filled with water at 15° C. ±2° C. and a level of water at 100 mm±5 mm and is capped. The bottle is conditioning during 24 hours at room temperature. Then, the bottle is dropped. The fall of the bottle is free, but the body of the bottle is guided with a tube. The tube has a diameter bigger than the maximal diameter of the bottle.

As it is a cumulative drop count, the drops on the same bottle are done until its breakage.

Results:

TABLE 1

| Dropping height (m) | Number of drops passed PEF bottles 10 | Number of drops passed PEF bottles 10° | Number of drops passed PEF bottles 10° | Number of drops passed PEF bottles 10° | Number of drops passed PEF bottles 10° | Number of drops passed PEF bottles 10° | Number of drops passed PEF bottles 10° |
|---|---|---|---|---|---|---|---|
| 1 | 2 | 0 | 0 | 0 | 1 | 0 | |
| 1.15 | 8 | | | | | | |
| 1.3 | 5 | | | | | | |
| 1.45 | 8 | | | | | | |
| 1.6 | 5 | | | | | | |
| 1.75 | 12 | | | | | | |
| 2 | 6 | | | | | | |
| 2 | 7 | | | | | | |

For the bottle 10 according to the invention, for each of the 7 heights, a new bottle was dropped until it breaks. For instance at the height of 1.75 meter, the bottle passed 12 drops at this eight, and broke at the 13$^{th}$ drop. For the bottles 10° made of PEF out preform 1°, for, 5 bottles were dropped at 1.0 meter. Only one bottle passed once the impact test.

TABLE 2

| Dropping height (m) | Number of drops passed PEF bottles 10° |
|---|---|
| 0.5 | 4/5 |
| 1 | 1/5 |
| 2 | 0/5 |

In this table are reported the drop test for bottles 10° made of PEF out preform 1°. For each of the heights (50 cm, 1 m, 2 m), 5 bottles were dropped. At 50 cm, 4 passed the first drop, one broke at the first drop. At 1.0 meter, one passed the first drop, the four others broke. At 2.0 meters, all broke on the first drop.

These results show the PEF bottle 10° obtained from a preform 1° have a much higher failure rate at the drop test when compared the PEF bottle 10 made from a preform 10 according to the invention.

The invention claimed is:

1. A preform for the manufacture by stretch blow molding of a plastic container, preferably a bottle, said preform being of made by injection molding of at least one thermoplastic polymer of at least one FuranDiCarboxylic Acid (FDCA) monomer, preferably 2,5-FuranDiCarboxylic Acid (2,5-

FDCA) monomer, and at least one diol monomer, preferably monoethylene glycol (MEG) monomer and said preform comprising:
- a neck end;
- a neck support ring;
- and a closed tubular body portion, the tubular body portion comprising a straight part having a length L' and a bottom curved part having a radius R;
- said preform having a ratio Ø/L, wherein Ø is a specific outer diameter of the straight part of the closed tubular body portion and L is a generatrix length of the preform closed tubular body portion, L being such that L=L'=2πR/4, the ratio Ø/L being such that—in an increasing order of preference—:
- 0.10<Ø/L≤0.50,
- 0.15<Ø/L≤0.45,
- 0.20<Ø/L≤0.40,
- 0.25<Ø/L≤0.35.

2. A preform according to claim 1 wherein said preform is designed so as to produce, by injection stretch blow-molding a container, in a manner that the axial stretch ratio is greater than or equal to the hoop stretch ratio.

3. A preform according to claim 1, wherein a minimal thickness ($t_{min}$) of a side wall of the closed tubular body portion is—in mm and in an increasing order of preference—:
- 1.0<$t_{min}$≤3.5,
- 1.2<$t_{min}$≤3.2,
- 1.5<$t_{min}$≤3.0,
- 1.8<$t_{min}$≤2.5.

4. A preform according to at least claim 1, the bottom curved part of which presents an extra-thickness on which a lower end of a blowpipe is intended to rest during a blowing of the injection stretch blow-molding.

5. A method of manufacturing a container, preferably a bottle, comprising the steps of:
- providing a preform, said preform being of made by injection molding of at least one thermoplastic polymer of at least one FuranDiCarboxylic Acid (FDCA) monomer, preferably 2,5-FuranDiCarboxylic Acid (2,5-FDCA) monomer, and at least one diol monomer, preferably monoethylene glycol (MEG) monomer,
- placing the preform in a mold having a cavity,
- blowing the preform in the mold with a blowing device including a blowpipe, adapted to supply the cavity with a fluid at a blowing pressure to form the container, so that an axial stretch ratio of the container with respect to the preform is greater than or equal to a hoop stretch ratio of the container with respect to the preform.

6. A method according to claim 5, wherein the blowing pressure is less than or equal to 35 bars, preferably 30 bars, more preferably 25 bars, more preferably 20 bars, more preferably 15 bars, more preferably 10 bars.

7. A method according to claim 5, wherein the end of the blowpipe is brought inside the preform against an extra-thickness of the bottom curved part of the preform so that said lower end presses on the preform and contributes to the stretching.

8. A method according to claim 5, further comprising a step of filling the bottle with a liquid, preferably a beverage.

9. A method according to claim 5, wherein a preform according to claim 1 is provided.

10. A method according to claim 5, wherein;
- the axial stretch ratio is greater than or equal to—in an increasing order of preference—:
- 3.5; 4.0; 4.15; 4.30; 4.5; 5.0;
- and the hoop stretch ratio is smaller than or equal to—in an increasing order of preference—:
- 4.0; 3.75; 3.60; 3.50; 3.40; 3.30; 3.20; 3.0; 2.5.

11. A method according to claim 5, wherein the container includes from the top to the base:
- a neck,
- a shoulder,
- a tubular body portion,
- and a bottom,
- and wherein the ratio defined as bottom mass BM/total mass TM]×100, is such that—in % by weight and in an increasing order of preference—:
- (BM/TM)≤10.5
- 1<(BM/TM)≤9
- 5<(BM/TM)≤8
- 6<(BM/TM)≤7.

12. A method according to claim 5, wherein the container comprises at least one imprint, which is preferably selected from the group consisting of splines, grooves, ribs, embossings, decorative patterns, gripping elements, trademark indications, production indications, Braille characters, and a combination thereof.

13. A method according to claim 11, wherein the bottom of the container includes:
- a terminal curved portion,
- an internal axially inwardly directed dome,
- a base joining the terminal curved portion to the dome,
- and reinforcements.

14. A method according to claim 13, wherein the reinforcements comprise radially extended grooves and/or ribs with respect to an axis on the bottom, said grooves and/or ribs being regularly arranged around the axis, preferably on the terminal curved portion and on the base, and possibly on the dome.

15. A method according to claim 13, wherein there is at least one imprint which is a bulge located close to the apex of the dome.

* * * * *